No. 871,193. PATENTED NOV. 19, 1907.
E. W. STULL.
ARRANGEMENT FOR MOTOR DRIVES.
APPLICATION FILED JUNE 30, 1906.
2 SHEETS—SHEET 1.
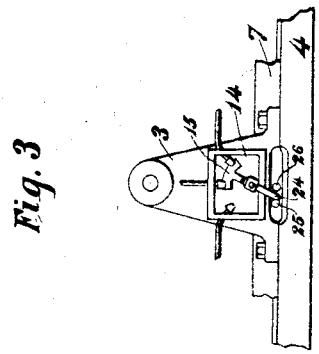
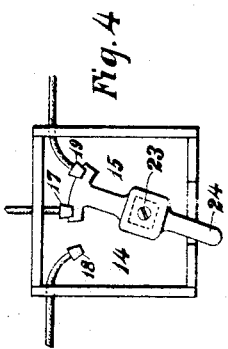
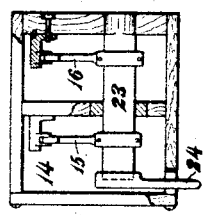
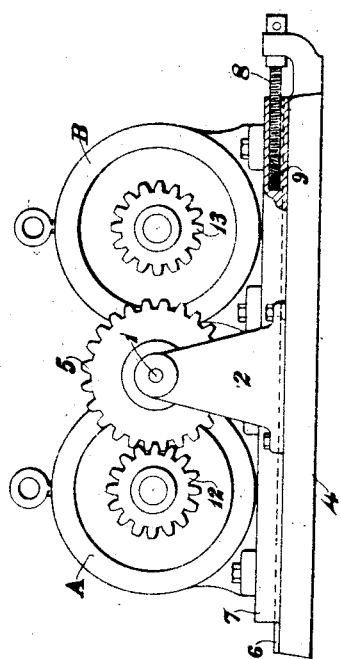
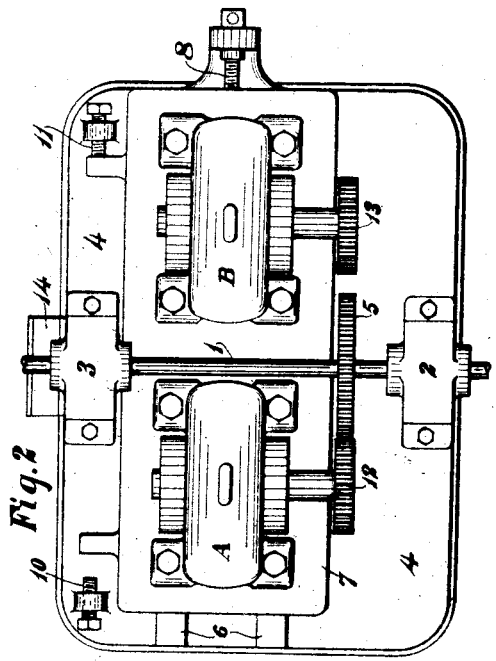
WITNESSES
INVENTOR
Emmett W. Stull
BY
ATTORNEY No. 871,193. PATENTED NOV. 19, 1907.
E. W. STULL.
ARRANGEMENT FOR MOTOR DRIVES.
APPLICATION FILED JUNE 30, 1906.

2 SHEETS—SHEET 2.

INVENTOR
Oliver W. Sharman
Fred J. Kinsey

INVENTOR
Emmett W. Stull
BY
Chas. E. Lord
ATTORNEY

UNITED STATES PATENT OFFICE.

EMMETT W. STULL, OF NORWOOD, OHIO, ASSIGNOR TO ALLIS-CHALMERS COMPANY, A CORPORATION OF NEW JERSEY, AND THE BULLOCK ELECTRIC MANUFACTURING COMPANY, A CORPORATION OF OHIO.

ARRANGEMENT FOR MOTOR-DRIVES.

No. 871,193.　　　Specification of Letters Patent.　　　Patented Nov. 19, 1907.

Application filed June 30, 1906. Serial No. 324,132.

To all whom it may concern:

Be it known that I, EMMETT W. STULL, a citizen of the United States, residing at Norwood, in the county of Hamilton and State of Ohio, have invented certain new and useful Improvements in Arrangement for Motor-Drives, of which the following is a full, clear, and exact specification.

My invention relates to systems of mounting and controlling electric motors.

The object of my invention is to provide an arrangement whereby the breaking down of the operating motor of any device will not render that device useless.

In many places where electric motors are used it is essential that there be no break in the continuous operation of the system. Such is the case for instance in rolling mills, where a breakdown in the operating mechanism often causes a great loss due to the cooling down of the heated metal. In these rolling mills it is absolutely essential that the process be continuous. I have provided a system in which, in case of the breaking down of the driving motor, an emergency motor may be connected to the device to be driven, the injured motor being disconnected both mechanically and electrically so that it may be removed and repaired at leisure.

In one aspect my invention consists of the combination of mechanism to be driven and a plurality of motors, any one of which may be moved into proper position to drive said mechanism and the other motors moved out of such position.

In a more specific aspect my invention consists of the combination of mechanism to be driven, a platform carrying a plurality of motors, and means whereby said platform may be moved to connect any one of the motors to the mechanism to be driven, and at the same time electrically connect the same motor to a source of current, this movement of the platform disconnecting every other motor both mechanically and electrically.

Other features of my invention will appear from the description and drawings and will be particularly pointed out in the claims.

Figure 6:
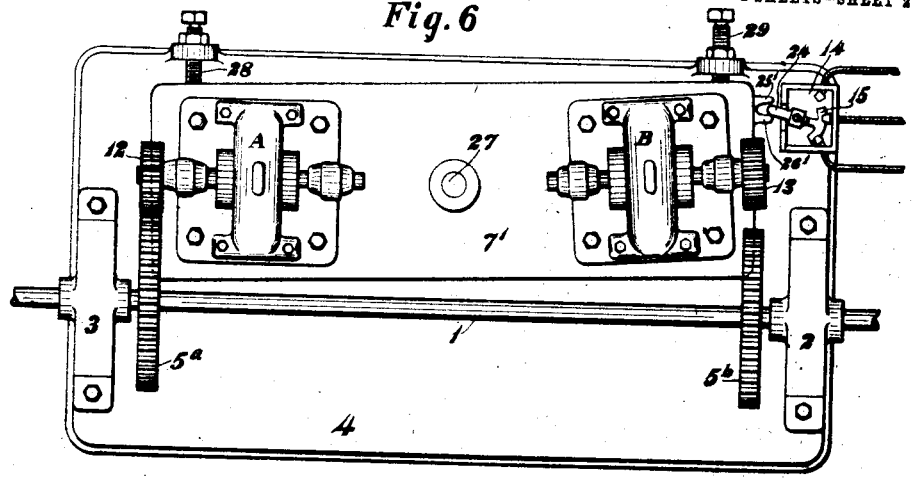
Figure 7:
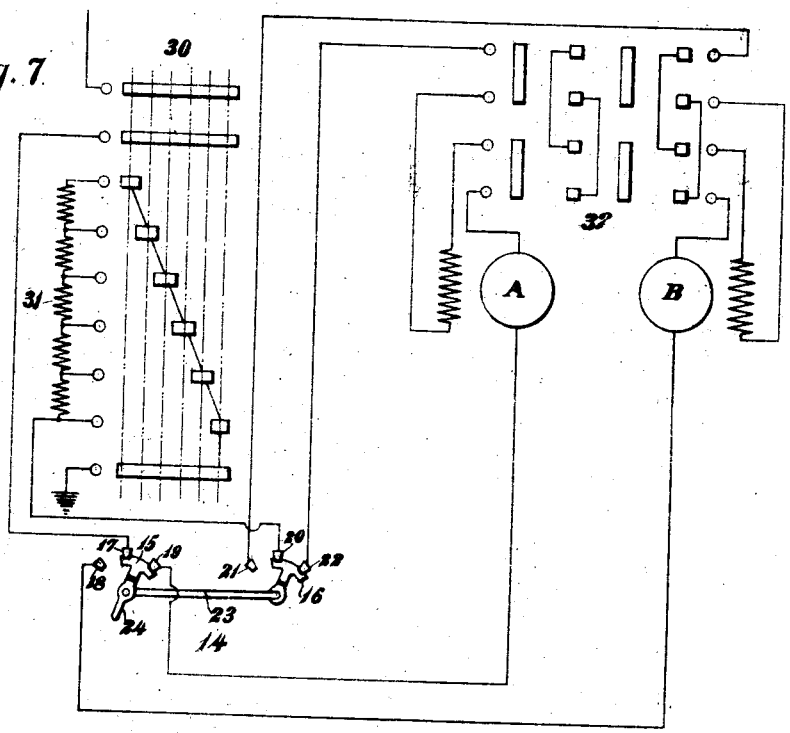

Figure 1 is an elevation of one embodiment of my invention. Fig. 2 is a plan view of the arrangement shown in Fig. 1. Fig. 3 is an elevation of one of the pedestals showing the main switch for the motors mounted thereon. Fig. 4 is a front elevation of the main switch, the front casing being removed. Fig. 5 is a side elevation of the switch, the side of the casing being removed and some of the parts being shown in section. Fig. 6 is a plan view of a modified mounting for the motors, and Fig. 7 is a diagram showing the electrical connections of the system.

In the drawings, 1 is the main shaft to be driven. To this shaft may be connected any desired apparatus, such for instance as cranes, mill rolls, hoisting machinery and the like. The shaft 1 is shown journaled in two pedestals 2 and 3 mounted on a stationary base 4.

In the arrangement shown in Fig. 1 there is a gear wheel 5 on the shaft 1. Mounted on the base 4 so as to slide thereon along splines 6, is a movable platform 7. This platform is movable by means of the screw 8, which engages with a thread 9 therein. There are two adjustable stops 10 and 11 on the base 4 to limit the movement of the platform 7. Mounted on the movable platform 7 are two motors A and B. On the shafts of these motors are pinions 12 and 13 respectively. As the platform 7 is moved to one end or the other of its movement either the pinion 12 or 13 meshes with the gear wheel 5.

Mounted on the pedestal 3 is a switch 14. This switch has two blades 15 and 16, the blade 15 connecting contact 17 with either contact 18 or 19 and blade 16 connecting contact 20 with either contact 21 or 22. These two switch blades are insulated from each other and are mounted on a common shaft 23 which may be of wood. This shaft is movable by a projection 24. The base of the pedestal 3 is hollowed out as shown and through this hollowed out portion extend two pins 25 and 26 mounted upon and movable with the platform 7. These two pins are placed on either side of the projection 24 and move the switch 14 whenever the platform 7 is moved. The contacts 17 and 20 are connected to a source of current through a controller 30, the contacts 18 and 21 are connected to the terminals of motor B, and the contacts 19 and 22 to those of motor A, as shown in Fig. 7. Thus when the platform is moved to mechanically disconnect either motor from the shaft, by the movement of the switch 14 it also electrically disconnects it from the source of current for the motors, and when moved to mechanically connect a motor to the shaft, also electrically connects it to the source of current.

In Fig. 6 a modification is shown in which the two motors A and B are mounted on the same side of the shaft 1 on a swinging platform 7' pivoted at 27. The general idea of this modification is the same as of that shown in Figs. 1 and 2. The modification shown in Fig. 6 is especially adapted to be used when it is impossible to put a motor on each side of the main shaft 1. The swinging platform 7' is movable by screws 28 and 29 which abut against one edge of this platform. The movement of the platform disconnects one motor from the main shaft and connects the other thereto, there being two gear wheels 5ª and 5ᵇ on the main shaft, one for each of the pinions 12 and 13. The movement of the platform 7 also operates the switch 14 by means of two fingers 25' and 26' which extend from said platform to include between them the projection 24 of the switch 14.

In Fig. 7 is shown the electrical connections of the system. There is a single controller 30 for the two motors. This controller is arranged to connect the switch contacts 17 and 20 respectively to the two terminals of any convenient source of supply, the terminal 20 being connected thereto through a variable resistance 31. This resistance 31 is cut in or out by the movement of the drum of the controller 30. Any other form of controller may be substituted for the one here shown. There is a reversing switch 32 for the motors, this reversing switch being double as shown, one part for each motor, so that when the reversing switch is in one of its operative positions the connections to the motors are such that the latter would drive the shaft in the same direction no matter which motor does the driving.

When the parts are in the position shown, the motor B is entirely disconnected mechanically and electrically, and the motor A has its pinion 12 in mesh with the gear 5 or 5ª, as the case may be, and its terminals electrically connected to the source of current supply through the switch 14 and the controller 30. In case of an accident to the motor A, the platform 7 or 7' is moved to mechanically disconnect the motor A from the shaft 1 and connect motor B to said shaft by causing pinions 13 to mesh with gear 5 or 5ᵇ as the case may be. As this transfer takes place the motor A is also electrically disconnected from the controller 30 and the source of supply, and the motor B connected thereto. The motor A can now be removed or repaired at leisure while the motor B can proceed with the work without necessitating any delay for repairs.

Many modifications of and substitutions for the specific arrangements shown and described may be made without departing from the spirit and scope of my invention, and it is my intention to cover all these in the following claims.

What I claim is:—

1. In combination with mechanism to be driven, a plurality of motors, and unitary means whereby any one of said motors may be moved into proper position to drive said mechanism and the others moved out of such position.

2. In combination with mechanism to be driven, a platform carrying a plurality of motors, and means for moving said platform to put any one of the motors in driving connection with the mechanism to be driven.

3. In combination, mechanism to be driven, a plurality of electric motors, a single motor controller and means for moving any one of said motors into driving relation with the mechanism to be driven, and simultaneously connecting said motor to the controller.

4. In combination, mechanism to be driven, a platform, a plurality of electric motors mounted on said platform, a motor controller, and means for moving said platform to simultaneously connect any one of said motors mechanically to the mechanism to be driven and electrically to the controller.

5. In combination, mechanism to be driven, a plurality of electric motors, and means whereby said motors may be connected to the mechanism to be driven only one at a time.

6. In combination, mechanism to be driven, a plurality of electric motors, a source of supply for said motors, and means for simultaneously disconnecting any one of said motors mechanically from the mechanism to be driven and electrically from the source of supply.

7. In combination, mechanism to be driven, a platform carrying a plurality of motors, means for moving said platform to mechanically connect any one of said motors to the mechanism to be driven, and a switch operated by the movable platform for electrically connecting the same motor to a source of supply.

8. In combination, a plurality of electric motors, a reversing switch for each motor, means whereby said reversing switches are all operated simultaneously, and a controller connected and arranged to control any one of the motors separately but not more than one simultaneously.

9. The combination of mechanism to be driven, a platform carrying a plurality of motors, and means whereby said platform may be moved to mechanically connect any one of the motors to the mechanism to be driven and at the same time to electrically connect the same motor to a source of supply, this movement of the platform disconnecting every other motor both mechanically and electrically.

10. In combination with mechanism to be driven, a plurality of motors, a motor controller, and means whereby any of said motors may be mechanically connected to said mechanism and put under the control of said controller.

11. In combination, mechanism to be driven, a plurality of electric motors, a motor controller, and unitary means for mechanically connecting any one of said motors to the mechanism to be driven and electrically connecting the same motor so that it may be controlled by said controller.

12. In combination with mechanism to be driven, a plurality of motors, a motor controller, and means whereby any of said motors may be mechanically connected to drive said mechanism and be under the control of said controller, and the remainder of the motors disconnected both mechanically and electrically.

In testimony whereof I affix my signature, in the presence of two witnesses.

EMMETT W. STULL.

Witnesses:
GEO. B. SCHLEY,
FRED J. KINSEY.